US009455565B2

(12) United States Patent
Barnette et al.

(10) Patent No.: US 9,455,565 B2
(45) Date of Patent: Sep. 27, 2016

(54) PROTECTION CIRCUIT THAT DETECTS FAULT IMPEDANCE DURING POWER UP OF A DEVICE

(71) Applicant: Lenovo Enterprise Solutions (Singapore) Pte. Ltd., Singapore (SG)

(72) Inventors: Jamaica L. Barnette, Durham, NC (US); Raymond M. Clemo, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 130 days.

(21) Appl. No.: 14/619,151

(22) Filed: Feb. 11, 2015

(65) Prior Publication Data

US 2016/0233659 A1 Aug. 11, 2016

(51) Int. Cl.
*H02H 3/08* (2006.01)
(52) U.S. Cl.
CPC ...................................... *H02H 3/08* (2013.01)
(58) Field of Classification Search
CPC ....................................................... H02H 3/08
USPC ............................................................ 361/87
See application file for complete search history.

(56) References Cited

U.S. PATENT DOCUMENTS

| 6,687,110 | B2 | 2/2004 | Murray | |
|---|---|---|---|---|
| 7,333,778 | B2* | 2/2008 | Pehlke | H03C 1/06 330/10 |
| 8,209,571 | B2* | 6/2012 | Lee | G01R 31/31717 714/715 |
| 2003/0227403 | A1* | 12/2003 | Nakagawa | H03K 19/23 341/144 |
| 2005/0231538 | A1* | 10/2005 | Deng | B41J 2/16579 347/9 |
| 2007/0236202 | A1* | 10/2007 | Cicalini | G05F 3/205 323/313 |
| 2009/0102561 | A1* | 4/2009 | Murin | H03F 1/0272 330/262 |

(Continued)

FOREIGN PATENT DOCUMENTS

| EP | 1076392 A2 | 2/2001 |
|---|---|---|
| EP | 2403091 A3 | 4/2013 |
| WO | WO2011116832 A1 | 9/2011 |

OTHER PUBLICATIONS

K.W.E. Cheng, "Overview of the DC Power Conversion and Distribution", Asian Power Electronics Journal, vol. 2, No. 2, Oct. 2008, pp. 75-82.

(Continued)

*Primary Examiner* — Scott Bauer
(74) *Attorney, Agent, or Firm* — Katherine S. Brown; Jeffrey L. Streets (57) ABSTRACT

A protection circuit or electronic circuit breaker protects and supplies power to a device load. The protection circuit includes a current mirror, a reference load that models the device load, and a comparator circuit that outputs a signal indicating that a fault has been detected in the device load during turn on. The current mirror provides an amount of current in proportion to the current supplied to the device load. The same proportion is used to calculate the capacitance and resistance of the reference load. Accordingly, if the device load has no fault, the reference voltage remains proportional to the output voltage to the device load. However, if the device load has a fault, the reference voltage will increase faster than the output voltage such that the comparator will generate a fault signal that turns off a transistor pass element that was supplying current to the device load.

16 Claims, 4 Drawing Sheets

(56) References Cited

U.S. PATENT DOCUMENTS

2009/0109589 A1 4/2009 Yoo et al.
2009/0188893 A1 7/2009 Titus
2011/0286134 A1 11/2011 Zylstra et al.
2014/0211345 A1 7/2014 Thompson et al.

OTHER PUBLICATIONS

Robert V. White, "Using On-Board Power Systems", In Telecommunications Energy Conference, 2004. Intelec 2004. 26th Annual International, Artesyn Technologies, Westminster, Colorado, 2004 IEEE, pp. 234-240.

* cited by examiner

PROTECTION CIRCUIT THAT DETECTS FAULT IMPEDANCE DURING POWER UP OF A DEVICE

BACKGROUND

1. Field of the Invention

The present invention relates to protection circuits, devices that incorporate protection circuits, and methods of protecting circuits and devices from damage due to faults or low impedance during power up.

2. Background of the Related Art

Many printed circuit cards use an electronic circuit breaker (ECB) protection circuit that protects against faults or low impedances that may occur while the printed circuit card is energized. These protection circuits usually have at least one threshold current limit, above which, the protection circuit removes energy from the intended device load and turns off.

Figure 1:
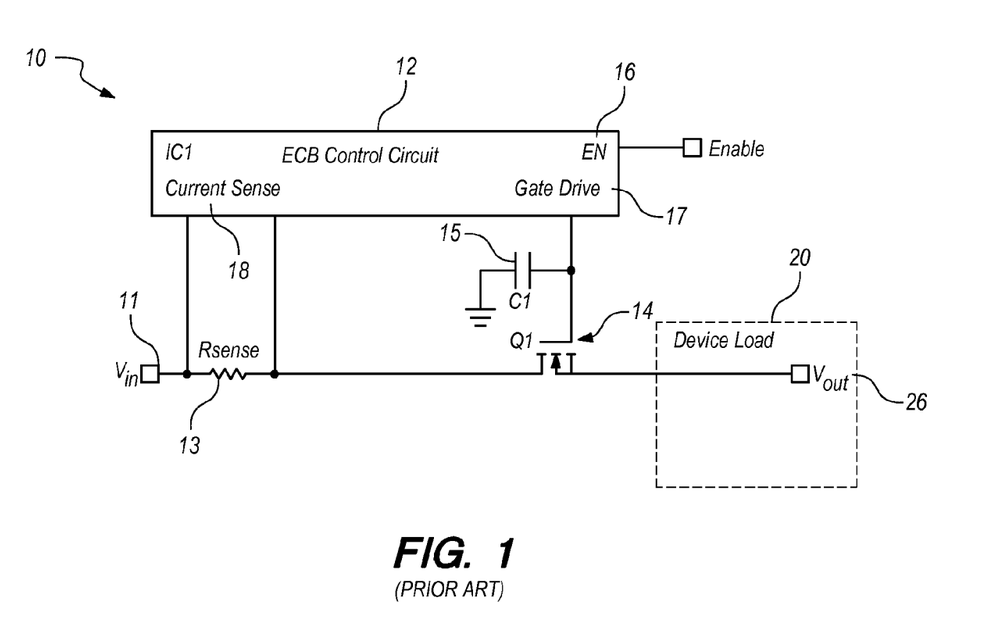
FIG. 1 is a circuit diagram of a prior art electronic circuit breaker for controlling the amount of electrical current provided to a load.

FIG. 1 is a circuit diagram of a prior art electronic circuit breaker 10 for controlling the amount of electrical current provided to a device load 20. The power supply (not shown) provides an input voltage ($V_{in}$) 11, which is assumed to be a positive voltage (possibly 12V) that provides power to the device load 20 through the ECB 10. The ECB 10 consists of an ECB Control Circuit 12 illustrates as an integrated circuit ($IC_1$), a current sense resistor ($R_{sense}$) 13, a transistor pass element ($Q_1$) 14 such as an n-channel MOSFET, and a soft start timing capacitor (C1) 15 coupled to ground.

When an Enable signal is asserted to the Enable pin (EN) 16 of the ECB control circuit 12, the ECB control circuit 12 causes a gate drive output 17 to generate a charging current to the soft start timing capacitor 15, causing the voltage on the soft start timing capacitor 15 to rise and the transistor pass element 214 to begin to turn on. As the transistor pass element ($Q_1$) 14 turns on, the output voltage ($V_{out}$) 26 on the device load 20 begins to rise. Assuming that the device load 20 has no detectable fault, the transistor pass element 14 continues to turn on until the output voltage ($V_{out}$) 26 equals input voltage ($V_{in}$) 11 from the power supply minus the voltage drop across the current sense resistor ($R_{sense}$) 13 and the transistor pass element ($Q_1$) 14.

The ECB control circuit 12 monitors the amount of electrical current supplied to the device load 20 using current sense inputs 18 that measure the voltage drop across the current sense resistor ($R_{sense}$) 13. If the load current exceeds a prescribed current threshold indicating that a fault exists in the device load, then the ECB control circuit 12 will discharge the voltage across the soft start timing capacitor ($C_1$) 15, turning off the transistor pass element ($Q_1$) 14 and removing power from the device load.

BRIEF SUMMARY

One embodiment of the present invention provides a protection circuit, comprising: a current supply line having a first end for coupling with a current supply, a second end for coupling with a device load, a current sense resistor, and a transistor pass element for controllably passing current to the device load, wherein the device load has a predetermined impedance and a predetermined capacitance; a controller having an enable input, current sense inputs coupled across the current sense resistor, and a gate drive output coupled to a gate terminal of the transistor pass element, wherein the controller turns on the transistor pass element in response to an enable signal at the enable input and turns off the transistor pass element in response to the current sense inputs indicating that the current supply line is passing current in excess of an overcurrent threshold; a reference load having a reference impedance and a reference capacitance; a current mirror having current sense inputs coupled across the current sense resistor and a transistor pass element for passing current to the reference load, wherein the amount of current passed to the reference load is a fixed proportion of the current to the device load, and wherein the reference impedance is the fixed proportion of the device impedance and the reference capacitance is the fixed proportion of the device capacitance; a comparator having a non-inverting input coupled to voltage on the proportional load, an inverting input coupled to voltage on the device load, and an output; a latch circuit having an input coupled to an output of the comparator and an output coupled to the enable input of the controller, wherein the latch circuit latches the controller off in response to a positive output from the comparator; and a switch circuit having a first input coupled to the supply voltage, a second input coupled to the voltage on the device load, and an output to the current mirror, wherein the switch circuit turns off the current mirror in response to the voltage on the device load exceeding a predetermined fraction of the supply voltage.

Another embodiment of the present invention provides a printed circuit board comprising the device load and the protection circuit described above.

Yet another embodiment of the present invention provides a method, comprising: measuring an amount of electrical current passing from a power supply to a device load; controlling a transistor pass element to control the amount of electrical current passing from the power supply to the device load, wherein the device load has a predetermined impedance and a predetermined capacitance; providing a reference amount of electrical current to a reference load, wherein the reference amount of electrical current is a fixed proportion of the amount of electrical current passing to the device load, wherein the reference load has a reference impedance that is the fixed proportion of the predetermined impedance, and wherein the reference load has a reference capacitance that is the fixed proportion of the predetermined capacitance; and turning off the transistor pass element in response to the voltage on the reference load exceeding the voltage on the device load.

DETAILED DESCRIPTION

One embodiment of the present invention provides a protection circuit, comprising: a current supply line having a first end for coupling with a current supply, a second end for coupling with a device load, a current sense resistor, and a transistor pass element for controllably passing current to the device load, wherein the device load has a predetermined impedance and a predetermined capacitance; a controller having an enable input, current sense inputs coupled across the current sense resistor, and a gate drive output coupled to a gate terminal of the transistor pass element, wherein the controller turns on the transistor pass element in response to an enable signal at the enable input and turns off the transistor pass element in response to the current sense inputs indicating that the current supply line is passing current in excess of an overcurrent threshold; a reference load having a reference impedance and a reference capacitance; a current mirror having current sense inputs coupled across the current sense resistor and a transistor pass element for passing current to the reference load, wherein the amount of current passed to the reference load is a fixed proportion of the current to the device load, and wherein the reference impedance is the fixed proportion of the device impedance and the reference capacitance is the fixed proportion of the device capacitance; a comparator having a non-inverting input coupled to voltage on the proportional load, an inverting input coupled to voltage on the device load, and an output; a latch circuit having an input coupled to an output of the comparator and an output coupled to the enable input of the controller, wherein the latch circuit latches the controller off in response to a positive output from the comparator; and a switch circuit having a first input coupled to the supply voltage, a second input coupled to the voltage on the device load, and an output to the current mirror, wherein the switch circuit turns off the current mirror in response to the voltage on the device load exceeding a predetermined fraction of the supply voltage.

Optionally, the controller may immediately turn off the transistor pass element in response to the current sense inputs indicating that the current supply line is passing current in excess of a first overcurrent threshold, and turn off the transistor pass element in response to the current sense inputs indicating that the current supply line is passing current in excess of a second overcurrent threshold for more than a predetermined period of time, wherein the second overcurrent threshold is lower than the first overcurrent threshold.

Another embodiment of the present invention provides a printed circuit board comprising the device load and the protection circuit described above. The device load may be any electronic device, including, without limitation, a motherboard, network adapter, graphics adapter, memory module, network switch, or blade server.

Yet another embodiment of the present invention provides a method, comprising: measuring an amount of electrical current passing from a power supply to a device load; controlling a transistor pass element to control the amount of electrical current passing from the power supply to the device load, wherein the device load has a predetermined impedance and a predetermined capacitance; providing a reference amount of electrical current to a reference load, wherein the reference amount of electrical current is a fixed proportion of the amount of electrical current passing to the device load, wherein the reference load has a reference impedance that is the fixed proportion of the predetermined impedance, and wherein the reference load has a reference capacitance that is the fixed proportion of the predetermined capacitance; and turning off the transistor pass element in response to the voltage on the reference load exceeding the voltage on the device load.

Optionally, the method may further include turning off the transistor pass element in response to the amount of electrical current passing through the current sense resistor exceeding an overcurrent threshold. In another option, the method may further include, in response to the voltage on the reference load exceeding the voltage on the device load, setting a latch circuit to prevent the transistor pass element from being turned back on. In a still further option, the method may further include turning off the reference amount of electrical current to the reference load in response to the voltage on the device load exceeding a predetermined fraction of a supply voltage from the power supply.

Figure 2:
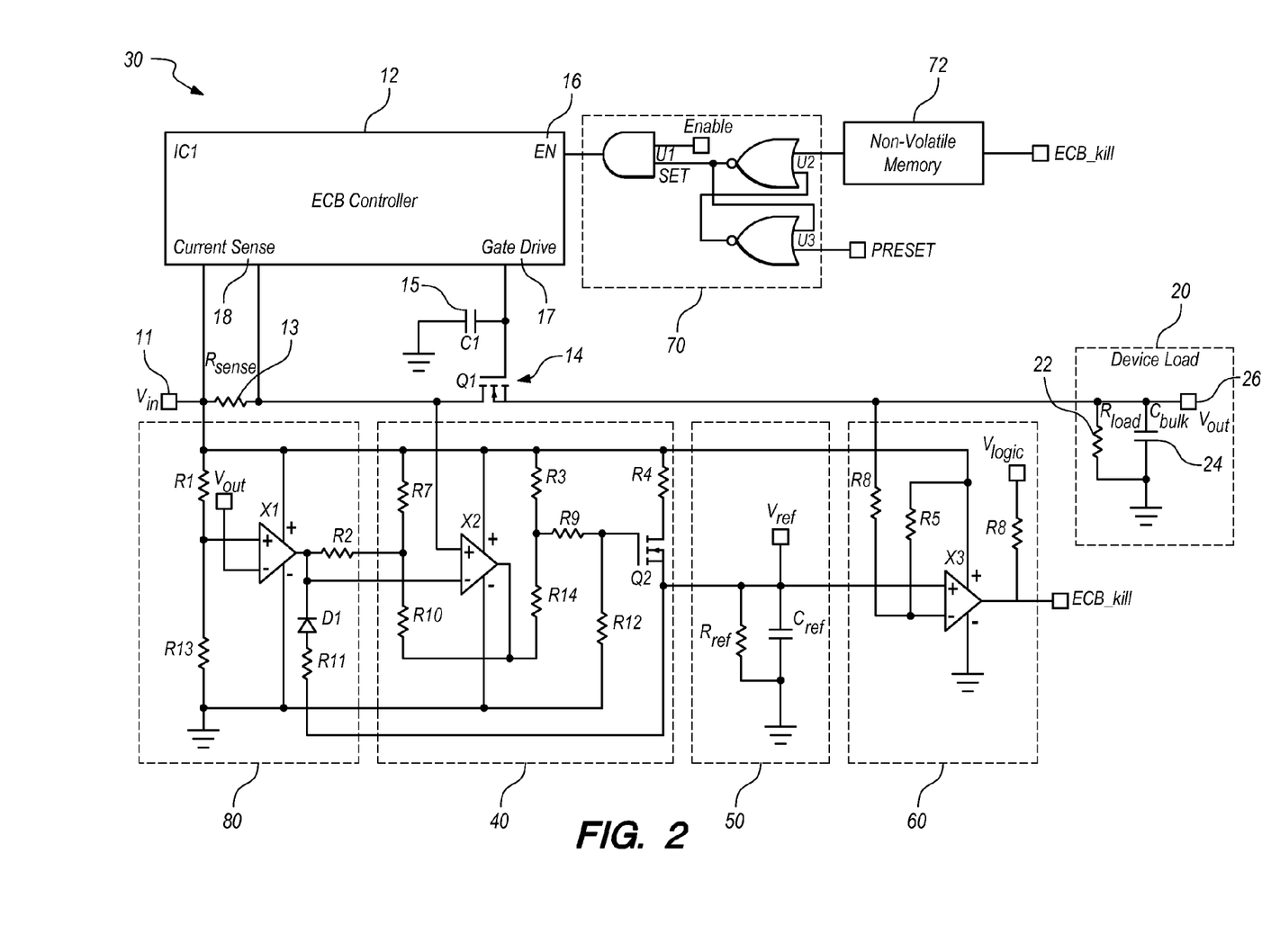
FIG. 2 is a circuit diagram of an electronic circuit breaker in accordance with an embodiment of the present invention for controlling the amount of electrical current provided to a load.

FIG. 2 is a circuit diagram of an electronic circuit breaker 30 in accordance with an embodiment of the present invention for controlling the amount of electrical current provided to the device load 20. A power supply (not shown) provides an input voltage ($V_{in}$) 11, which is assumed to be a positive voltage (possibly 12V) that provides power to the device load 20, which may be represented by a resistor ($R_{load}$) 22 and a capacitor ($C_{bulk}$) 24, through the ECB 10. The ECB 10 consists of an ECB Control Circuit 12 illustrated as an integrated circuit ($IC_1$), a current sense resistor ($R_{sense}$) 13, a transistor pass element ($Q_1$) 14, and a soft start timing capacitor ($C_1$) 15 coupled to ground. The transistor pass element ($Q_1$) 14 may, without limitation, be a field effector transistor (FET), such as an n-channel metal-oxide-semiconductor field-effect transistor (MOSFET).

When an Enable signal is asserted to the Enable pin (EN) 16 of the ECB control circuit 12, typically by server sequence control circuitry, the ECB control circuit 12 causes a gate drive output 17 to generate a charging current to the soft start timing capacitor 15, causing the voltage on the soft start timing capacitor 15 to rise and the transistor pass element 14 to begin to turn on. As the transistor pass element ($Q_1$) 14 turns on, the output voltage ($V_{out}$) 26 on the device load 20 begins to rise, charging the capacitor ($C_{bulk}$) 24 and providing current through the resistor ($R_{load}$) 22. Assuming that the device load 20 has no detectable fault, the transistor pass element 14 continues to turn on until the output voltage ($V_{out}$) 26 equals input voltage ($V_{in}$) 11 from the power supply minus the voltage drop across the current sense resistor ($R_{sense}$) 13 and the transistor pass element ($Q_1$) 14.

The ECB control circuit 12 monitors the amount of electrical current supplied to the device load 20 using current sense inputs 18 that measure the voltage drop across the current sense resistor ($R_{sense}$) 13. If the load current exceeds a prescribed current threshold, then the ECB control circuit 12 will discharge the voltage across the soft start timing capacitor ($C_1$) 15, turning off the transistor pass element ($Q_1$) 14 and removing power from the device load.

In accordance with certain embodiments of the present invention, FIG. 2 shows the electronic circuit breaker 30 further including additional circuitry for detecting a fault condition during turn on. The additional circuitry may be described in terms of five separate circuit functions (outlined by dashed lines), including a current mirror 40, a reference load 50, a $V_{ref}$ to $V_{out}$ comparator circuit 60, a latch 70, and a disable switch 80.

The current mirror 40 monitors the load current flowing through the current sense resistor ($R_{sense}$) 13, which produces a voltage drop which a comparator ($X_2$) detects through resistor $R_2$ and resistor $R_7$. Another resistor $R_{10}$ provides feedback from the output of the comparator $X_2$. Resistor $R_3$ and resistor $R_{14}$ divide the output from the comparator $X_2$ to limit the voltage on the gate of the transistor pass element ($Q_2$), which in turn limits the amount of current that can flow through the transistor pass element ($Q_2$). Resistor $R_9$ and resistor $R_{12}$ set up a pre-bias for the transistor pass element ($Q_2$), and an output current range of the transistor pass element ($Q_2$) is set by the resistor $R_4$. A current mirror integrated circuit may be used as a substitute for the current mirror 40 as shown. The comparator ($X_2$), as well as other comparators disclosed herein, may be operational amplifiers ("op-amps").

The reference load 50 is a proportional representation of the device load 20. Where the device load 20 may be represented by the resistor ($R_{load}$) 22 and the capacitor ($C_{bulk}$) 24, the reference load 50 may include a resistor ($R_{ref}$) and a capacitor ($C_{ref}$). The resistance value of the resistor ($R_{ref}$) is calculated by multiplying the predetermined load resistance of the resistor ($R_{load}$) 22 by the current gain of the current mirror 40 (i.e., a proportionality factor or ratio of the reference current through the transistor pass element ($Q_2$) to the reference load 50 and the load current through the current sense resistor ($R_{sense}$) 13 to the device load 20. Similarly, the capacitance value of the capacitor ($C_{ref}$) is calculated by multiplying the predetermined load capacitance of the capacitor ($C_{bulk}$) 24 by the current gain of the current mirror 40.

When Enable pin (EN) 16 of the ECB control circuit 12 is asserted, the ECB control circuit begins to turn on the transistor pass element ($Q_1$) 14, which allows a load current to pass through the current sense resistor ($R_{sense}$) 13 and the transistor pass element ($Q_1$) 14 into the device load. Assuming that the device load has no fault, the load current begins to raise the voltage on the load ($V_{out}$). At the same time the current mirror 40 causes the transistor pass element ($Q_2$) to pass a proportional amount of current to the reference load 50 comprising the resistor ($R_{ref}$) and a capacitor ($C_{ref}$) such that the reference voltage ($V_{ref}$) rises.

The comparator circuit 60 includes a comparator ($X_3$) that compares the output voltage ($V_{out}$) to the reference voltage ($V_{ref}$) and asserts a signal (ECB_kill) to the latch 70 if a fault is detected. Resistor $R_5$ and resistor $R_6$ set a small pre-bias on the output voltage ($V_{out}$) for the minus input of the comparator ($X_3$). Assuming that the resistance and capacitance of the reference load 50 have been properly established to be proportional to the effective resistance and capacitance of the device load 20, then the reference voltage ($V_{ref}$) should increase at the same rate ($\delta V/\delta t$) as the output voltage ($V_{out}$).

Figure 3:
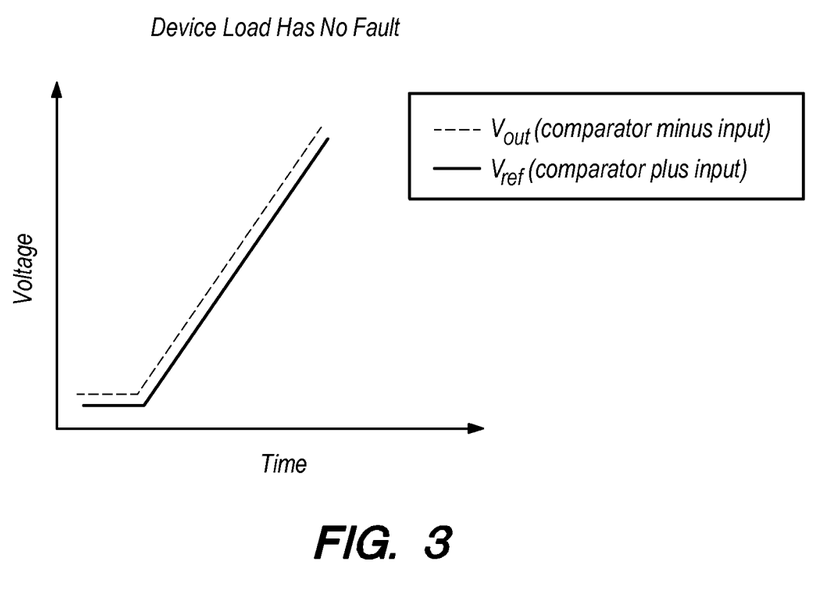
FIG. 3 is a graph illustrating the relationship of the voltage on the load ($V_{out}$) and the voltage on a proportional reference load ($V_{ref}$) during turn on without a fault.

FIG. 3 is a graph illustrating the relationship of the output voltage ($V_{out}$) 26 on the device load 20 and the reference voltage ($V_{ref}$) on the proportional reference load 50 during turn on in the situation that the device load 20 does not have a fault. As shown, the reference voltage and the output voltage rise proportionally, such that one is always greater than the other.

Figure 4:
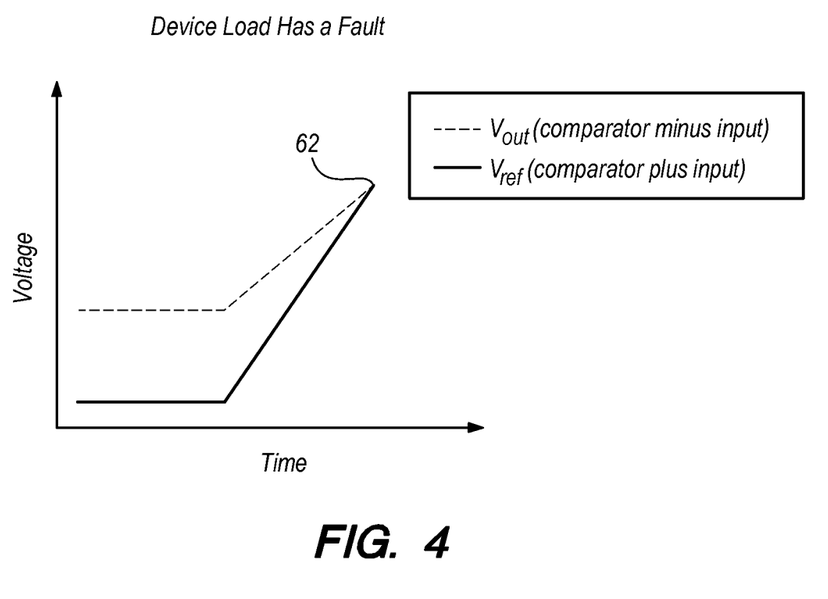
FIG. 4 is a graph illustrating the relationship of the voltage on the load ($V_{out}$) and the voltage on a proportional reference load ($V_{ref}$) during turn on when a fault condition exists on the output.

FIG. 4 is a graph illustrating the relationship of the output voltage ($V_{out}$) 26 on the device load 20 and the reference voltage ($V_{ref}$) on the proportional reference load 50 during turn on in the situation that the device load 20 has experienced a fault. When a fault condition exists, the device load 20 will draw additional current, which will reduce the rate at which the output voltage ($V_{out}$) increases and will increase the rate at which the reference voltage ($V_{ref}$) increases. If the fault draws enough current, the plus input of the comparator ($X_3$) (coupled to the reference voltage) will cross or exceed the minus input of the comparator ($X_3$) (coupled to the output voltage), which will cause the output of the comparator ($X_3$) to become positive (see point 62 in FIG. 4) and assert an output signal (ECB_kill) to the latch 70 indicating that a fault has been detected.

The latch 70 turns off (i.e., "latches" off) the ECB in response to receiving the positive output signal (ECB_kill) from the comparator. In the non-limiting example shown in FIG. 2, a first not-OR (NOR) gate ($U_2$) and a second not-OR (NOR) gate ($U_3$) form a simple flip-flop (FF). The PRESET signal toggles only during system power up to determine the SET output of the flip-flop. The SET signal is then ANDed with the Enable signal and allows the ECB to turn on when Enable asserts. If the ECB_kill signal asserts while the ECB 30 is turning on, then the flip-flop or latch is reset (i.e., the SET signal is a logical "0"), latching the ECB off as long as power to the latch 70 remains on. The ECB can be prevented from turning on even if system power is removed by storing the value of the ECB_kill signal in an optional non-volatile memory 72 and preventing the Enable (EN) input 16 to the ECB controller 12 from being asserted. The non-volatile memory may be cleared after the defective board has been repaired.

Assuming no faults are detected, the disable switch 80 disengages the current mirror 40 once the output voltage ($V_{out}$) has reached a predetermined level. The predetermined level is preferably a voltage level that $V_{out}$ is guaranteed to exceed so long as there is no fault. For example, a comparator ($X_1$) compares the output voltage ($V_{out}$) with some fraction of the supply voltage ($V_{in}$), set up by the resistor divider consisting of the resistor $R_1$ and the resistor $R_{13}$. During turn on, when the output voltage ($V_{out}$) reaches the predetermined fraction of the supply voltage ($V_{in}$), the output of the comparator ($X_1$) goes low. The low output signal of the comparator ($X_1$) forces the minus input of the comparator ($X_2$) low by producing a voltage drop across the resistor $R_2$, which ensures that the output of the comparator ($X_2$) will remains high and the transistor pass element ($Q_2$) will remains off. As shown, the low output of the comparator ($X_1$) also causes discharging of the reference capacitor ($C_{ref}$) through the diode ($D_1$) and resistor ($R_{11}$). Optionally, the reference capacitance is implemented by a plurality of capacitors that model the same temperature characteristics as the predetermined capacitance of the device load.

Figure 5:
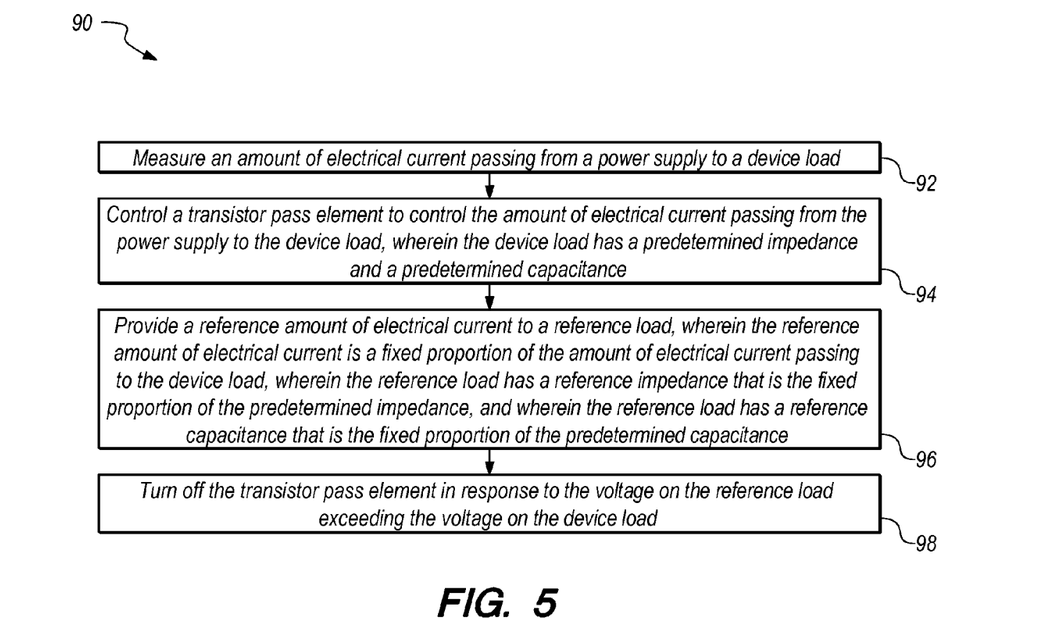
FIG. 5 is a flowchart of a method according to an embodiment of the present invention.

FIG. 5 is a flowchart of a method 90 according to an embodiment of the present invention. In step 92, the method measures an amount of electrical current passing from a power supply to a device load. In step 94, the method controls a transistor pass element to control the amount of electrical current passing from the power supply to the device load, wherein the device load has a predetermined impedance and a predetermined capacitance. In step 96, a reference amount of electrical current is provided to a reference load, wherein the reference amount of electrical current is a fixed proportion of the amount of electrical current passing to the device load, wherein the reference load has a reference impedance that is the fixed proportion of the predetermined impedance, and wherein the reference load has a reference capacitance that is the fixed proportion of the predetermined capacitance. Step 98 includes turning off the transistor pass element in response to the voltage on the reference load exceeding the voltage on the device load.

The flowcharts and block diagrams in the Figures illustrate the architecture, functionality, and operation of possible implementations of systems and methods according to various embodiments of the present invention. In this regard, each block in the flowchart or block diagrams may represent a module, segment, or portion of a system or method. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A protection circuit, comprising:
  a current supply line having a first end for coupling with a current supply, a second end for coupling with a device load, a current sense resistor, and a transistor pass element for controllably passing current to the device load, wherein the device load has a predetermined impedance and a predetermined capacitance;
  a controller having an enable input, current sense inputs coupled across the current sense resistor, and a gate drive output coupled to a gate terminal of the transistor pass element, wherein the controller turns on the transistor pass element in response to an enable signal at the enable input and turns off the transistor pass element in response to the current sense inputs indicating that the current supply line is passing current in excess of an overcurrent threshold;
  a reference load having a reference impedance and a reference capacitance;
  a current mirror having current sense inputs coupled across the current sense resistor and a transistor pass element for passing current to the reference load, wherein the amount of current passed to the reference load is a fixed proportion of the current to the device load, and wherein the reference impedance is the fixed proportion of the device impedance and the reference capacitance is the fixed proportion of the device capacitance;
  a comparator having a non-inverting input coupled to voltage on the proportional load, an inverting input coupled to voltage on the device load, and an output;
  a latch circuit having an input coupled to an output of the comparator and an output coupled to the enable input of the controller, wherein the latch circuit latches the controller off in response to a positive output from the comparator; and
  a switch circuit having a first input coupled to the supply voltage, a second input coupled to the voltage on the device load, and an output to the current mirror, wherein the switch circuit turns off the current mirror in response to the voltage on the device load exceeding a predetermined fraction of the supply voltage.

2. The protection circuit of claim 1, wherein the transistor pass element is a field effect transistor.

3. The protection circuit of claim 1, further comprising:
  a soft start capacitor coupled between the gate drive output and ground.

4. The protection circuit of claim 1, wherein the comparator includes an operational amplifier.

5. The protection circuit of claim 1, wherein the latch circuit is reset during system power up to latch in a condition that allows an enable signal to control whether controller is able to turn on the transistor pass element.

6. The protection circuit of claim 1, further comprising:
  a non-volatile memory coupled between the comparator and the latch circuit for storing the output of the comparator.

7. The protection circuit of claim 1, wherein the latch circuit is a flip flop.

8. The protection circuit of claim 1, wherein the proportional load includes a reference capacitor, and wherein the switch circuit drains the reference capacitor in response to the voltage on the device load exceeding a predetermined fraction of the supply voltage.

9. The protection circuit of claim 1, wherein the controller immediately turns off the transistor pass element in response to the current sense inputs indicating that the current supply line is passing current in excess of a first overcurrent threshold, and wherein the controller turns off the transistor pass element in response to the current sense inputs indicating that the current supply line is passing current in excess of a second overcurrent threshold for more than a predetermined period of time, wherein the second overcurrent threshold is lower than the first overcurrent threshold.

10. The protection circuit of claim 1, wherein the reference capacitance is implemented by a plurality of capacitors that model the same temperature characteristics as the predetermined capacitance of the device load.

11. The protection circuit of claim 1, wherein the controller is an integrated circuit.

12. A printed circuit board, comprising:
  the protection circuit of claim 1; and
  the device load.

13. A method, comprising:
  measuring an amount of electrical current passing from a power supply to a device load;
  controlling a transistor pass element to control the amount of electrical current passing from the power supply to the device load, wherein the device load has a predetermined impedance and a predetermined capacitance;
  providing a reference amount of electrical current to a reference load, wherein the reference amount of electrical current is a fixed proportion of the amount of electrical current passing to the device load, wherein the reference load has a reference impedance that is the fixed proportion of the predetermined impedance, and wherein the reference load has a reference capacitance that is the fixed proportion of the predetermined capacitance; and turning off the transistor pass element in response to the voltage on the reference load exceeding the voltage on the device load.

14. The method of claim 13, further comprising:
turning off the transistor pass element in response to the amount of electrical current passing through the current sense resistor exceeding an overcurrent threshold.

15. The method of claim 13, further comprising:
in response to the voltage on the reference load exceeding the voltage on the device load, setting a latch circuit to prevent the transistor pass element from being turned back on.

16. The method of claim 13, further comprising:
turning off the reference amount of electrical current to the reference load in response to the voltage on the device load exceeding a predetermined fraction of a supply voltage from the power supply.

* * * * *